US012749973B2

(12) United States Patent
Jung et al.

(10) Patent No.: US 12,749,973 B2
(45) Date of Patent: Sep. 29, 2026

(54) POWER CONVERSION DEVICE HAVING MULTI-LEVEL STRUCTURE

(71) Applicant: LG INNOTEK CO., LTD., Seoul (KR)

(72) Inventors: Kwang Soon Jung, Seoul (KR); Jeong Heum Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 190 days.

(21) Appl. No.: 18/574,437

(22) PCT Filed: Jul. 4, 2022

(86) PCT No.: PCT/KR2022/009625
§ 371 (c)(1),
(2) Date: Dec. 27, 2023

(87) PCT Pub. No.: WO2023/277672
PCT Pub. Date: Jan. 5, 2023

(65) Prior Publication Data
US 2024/0322687 A1 Sep. 26, 2024

(30) Foreign Application Priority Data
Jul. 2, 2021 (KR) ........................ 10-2021-0087295

(51) Int. Cl.
*H02M 3/158* (2006.01)
*H02J 1/08* (2006.01)
(Continued)

(52) U.S. Cl.
CPC ............... *H02M 3/158* (2013.01); *H02J 1/08* (2013.01); *H02M 1/007* (2021.05);
(Continued)

(58) Field of Classification Search
CPC ............. H02M 1/0077; H02M 1/0067; H02M 1/0074; H02M 1/008; H02M 1/009;
(Continued)

(56) References Cited

U.S. PATENT DOCUMENTS

2011/0273917 A1* 11/2011 Maitra .................... H02S 40/32 363/74
2014/0319918 A1* 10/2014 Siri ......................... H02J 3/381 307/66
(Continued)

FOREIGN PATENT DOCUMENTS

JP 09-327127 12/1997
JP 10-304662 11/1998
(Continued)

OTHER PUBLICATIONS

Korean Office Action dated Aug. 18, 2025 issued in Application No. 10-2021-0087295.
(Continued)

*Primary Examiner* — Nguyen Tran
(74) *Attorney, Agent, or Firm* — KED & ASSOCIATES, LLP

(57) ABSTRACT

A power conversion device according to one embodiment of the present invention comprises: a plurality of converters that are respectively connected to a plurality of cell strings; and an auxiliary power supply unit for supplying driving power to each of the plurality of converters, wherein the auxiliary power supply unit comprises: a first voltage conversion part for converting a first voltage of at least one output terminal from among output terminals of the plurality of cell strings into a second voltage, and outputting same;
(Continued)

and a second voltage conversion part for supplying driving power to each of the plurality of converters by converting the second voltage, which has been output from the first voltage conversion part, into a third voltage, wherein the plurality of converters have a multi-level structure.

19 Claims, 14 Drawing Sheets

(51) Int. Cl.
*H02M 1/00* (2006.01)
*H02S 40/30* (2014.01)
*H02J 101/24* (2026.01)

(52) U.S. Cl.
CPC .......... *H02M 1/0077* (2021.05); *H02S 40/30* (2014.12); *H02J 2101/25* (2026.01)

(58) Field of Classification Search
CPC .... H02M 1/007; H02M 3/158; H02M 3/1584; H02M 3/1586; H02M 3/156; H02M 3/157; H02M 3/155; H02M 3/1557; H02J 1/00; H02J 1/08; H02J 1/082; H02J 1/084; H02J 1/10; H02J 1/106; H02S 40/30; H02S 40/32; H02S 40/36; H02S 40/38
See application file for complete search history.

(56) References Cited

U.S. PATENT DOCUMENTS

| | | | | |
|---|---|---|---|---|
| 2015/0194256 | A1* | 7/2015 | Takagi .............. | H02M 3/33507 336/200 |
| 2016/0072396 | A1 | 3/2016 | Deboy et al. | |
| 2017/0126010 | A1* | 5/2017 | Canales .................. | H02J 1/102 |
| 2022/0001750 | A1* | 1/2022 | Zushi ........................ | H02J 7/35 |

FOREIGN PATENT DOCUMENTS

| | | |
|---|---|---|
| JP | 2004-215439 | 7/2004 |
| JP | 2007-259614 | 10/2007 |
| WO | WO 2013 /014879 | 1/2013 |

OTHER PUBLICATIONS

International Search Report dated Oct. 26, 2022 issued in Application No. PCT/KR2022/009625.

* cited by examiner

FIG. 10

| Input voltage range of auxiliary power supply unit | Required function | Applicable circuit |
|---|---|---|
| V1 <Input voltage range of auxiliary power supply unit< V2 | Voltage step-down | Linear regulator, buck converter |
| V3 <Input voltage range of auxiliary power supply unit< V4 | Voltage step-up | Charge pump, boost converter |
| V3 <Input voltage range of auxiliary power supply unit< V2 | Voltage step-up and step-down | Buck-boost converter |

FIG. 11

| No. | Circuit combination | |
|---|---|---|
| | Step-down regulator | Step-up regulator |
| 1 | Linear regulator | Charge pump |
| 2 | Linear regulator | Boost converter |
| 3 | Buck converter | Charge pump |
| 4 | Buck converter | Boost converter |

POWER CONVERSION DEVICE HAVING MULTI-LEVEL STRUCTURE

CROSS-REFERENCE TO RELATED PATENT APPLICATIONS

This application is a U.S. National Stage Application under 35 U.S.C. § 371 of PCT Application No. PCT/KR2022/009625, filed Jul. 4, 2022, which claims priority to Korean Patent Application No. 10-2021-0087295, filed Jul. 2, 2021, whose entire disclosures are hereby incorporated by reference.

TECHNICAL FIELD

The present invention relates to a power conversion device, and more particularly, to a power conversion device using a plurality of converters having a multi-level structure and a solar module.

BACKGROUND ART

Photovoltaic power generation is an eco-friendly energy generation method that is widely used as a replacement for existing chemical or nuclear power generation. Photovoltaic power generation is divided into an independent type where a battery is connected to a converter and a linked type where a battery is connected to the power system. In general, stand-alone power generation is configured with solar cells, storage batteries, power conversion devices, and the like, and a power grid-connected system is configured to be connected to a commercial power source to exchange power with the load grid line.

Solar cell modules have different maximum power points depending on the amount of sunlight, temperature, and the like. Module-level power electronics (MLPE) with maximum power point tracking (MPPT) control on a module basis can be used to operate the solar cell at its maximum power point. However, the MLPE with a single converter is difficult to follow the optimized maximum power point when the amount of sunlight and temperature of each cell inside the module is different.

As shown in FIG. 1, in a method with a single converter, all cells are connected in series and inputted to the MLPE, and the MLPE performs maximum power point tracking control for the entire solar cell module. In this case, when the maximum power point is different for each cell string due to the difference in the amount of sunlight in the cell string, there is a problem in that the maximum power point tracking control for the individual string is impossible.

In addition, as shown in FIG. 2, in the MLPE of a method with a single converter, the solar cell module, DC/DC converter, and controller are designed with the same reference potential (electric potential). For this reason, when the controller detects the solar cell module voltage and the DC/DC converter output voltage, the voltage detection circuit can be implemented only with the resistor divider circuit. However, in MLPE of multi-level structure, the above method cannot be applied as it is.

In addition, MLPE with a single converter application method uses the same ground for the solar cell module, DC/DC converter, controller, and auxiliary power. Due to this, as shown in FIGS. 3 and 4, it is possible to configure an auxiliary power circuit for receiving power from the solar cell module and supplying auxiliary power to a converter, a controller, and the like. However, in MLPE of multi-level structure, the above method cannot be applied as it is.

DETAILED DESCRIPTION OF THE INVENTION

Technical Subject

The present invention for solving the technical problem is intended to provide a power conversion device and a solar module using a plurality of converters having a multi-level structure.

Technical Solution

In order to solve the above technical problem, a power conversion device according to an embodiment of the present invention comprises: a plurality of converters that are respectively connected to a plurality of cell strings; and an auxiliary power supply unit for supplying driving power to each of the plurality of converters, wherein the auxiliary power supply unit comprises: a first voltage conversion part for converting a first voltage of at least one output terminal from among output terminals of the plurality of cell strings into a second voltage, and outputting same; and a second voltage conversion part for supplying driving power to each of the plurality of converters by converting the second voltage, which has been outputted from the first voltage conversion part, into a third voltage, and wherein the plurality of converters has a multi-level structure.

In addition, the first voltage conversion part may output a different level of the second voltage depending on the range of the first voltage.

In addition, the first voltage conversion part may include at least one among a step-down regulator, a step-up regulator, and a step-up and step-down regulator.

In addition, the first voltage conversion part may include at least one among a buck converter, a linear regulator, a boost converter, a charge pump, and a buck-boost converter.

In addition, the first voltage conversion part may supply power to a device operating at the second voltage.

In addition, in the first voltage conversion part, each output terminal of the plurality of cell strings may be connected in parallel through a switching element.

In addition, the second voltage conversion part may supply power to a device operating at the third voltage.

In addition, the second voltage conversion part may operate by receiving an enable signal.

In addition, the second voltage conversion part may include an isolated converter.

In addition, the second voltage conversion part may include at least one of a flyback converter, an LLC converter, and a forward converter.

In addition, it may include a third voltage conversion part that converts the second voltage into a fourth voltage and outputs it.

In addition, the third voltage conversion part may supply power to a device operating at the fourth voltage.

In addition, it may include a fourth voltage conversion part that converts the third voltage into a fifth voltage and outputs it.

In addition, the fourth voltage conversion part may supply power to a device operating at the fifth voltage.

In order to solve the above technical problem, a power conversion device according to an embodiment of the present invention comprises: a plurality of converters that are respectively connected to a plurality of cell strings; an auxiliary power supply unit that supplies driving power to each of the plurality of converters; and a control unit that monitors at least one among an input signal, an output signal of the plurality of converters, and a current flowing in the inductor included in each of the converters, wherein the auxiliary power supply unit comprises: a first voltage conversion part for converting a first voltage of at least one output terminal from among output terminals of the plurality of cell strings into a second voltage, and outputting same; and a second voltage conversion part for supplying driving power to each of the plurality of converters by converting the second voltage, which has been outputted from the first voltage conversion part, into a third voltage, wherein the first voltage conversion part supplies driving power to the control unit, wherein the control unit outputs an enable signal to the second voltage conversion part, wherein the second voltage conversion part operates by receiving the enable signal, and wherein the plurality of converters has a multi-level structure.

In order to solve the above technical problem, a solar module according to an embodiment of the present invention comprises: a plurality of cell strings each including one or more solar cells; a plurality of converters being respectively connected to each of the cell strings; and a plurality of auxiliary power supply units supplying driving power to each of the plurality of converters using voltages being outputted from the respective cell strings, wherein the auxiliary power supply unit comprises: a first voltage conversion part for converting a first voltage of at least one output terminal from among output terminals of the plurality of cell strings into a second voltage, and outputting same; and a second voltage conversion part for supplying driving power to each of the plurality of converters by converting the second voltage, which has been outputted from the first voltage conversion part, into a third voltage, and wherein the plurality of converters has a multi-level structure.

Advantageous Effects

According to embodiments of the present invention, when using an MLPE with a multi-level structure, an auxiliary power circuit can be implemented to smoothly supply auxiliary power to each DC/DC converter, control circuit, PLC circuit, and the like. In addition, designing and optimization of auxiliary power circuits with a wide input range become facilitated. By applying an auxiliary power circuit with a wide input range, the input voltage range at which MLPE can operate is expanded. Because of this, the conditions under which power generation is possible can be increased.

BRIEF DESCRIPTION OF DRAWINGS

FIGS. 7 to 11 are diagrams for explaining a power conversion device according to an embodiment of the present invention.

BEST MODE

Figure 1:
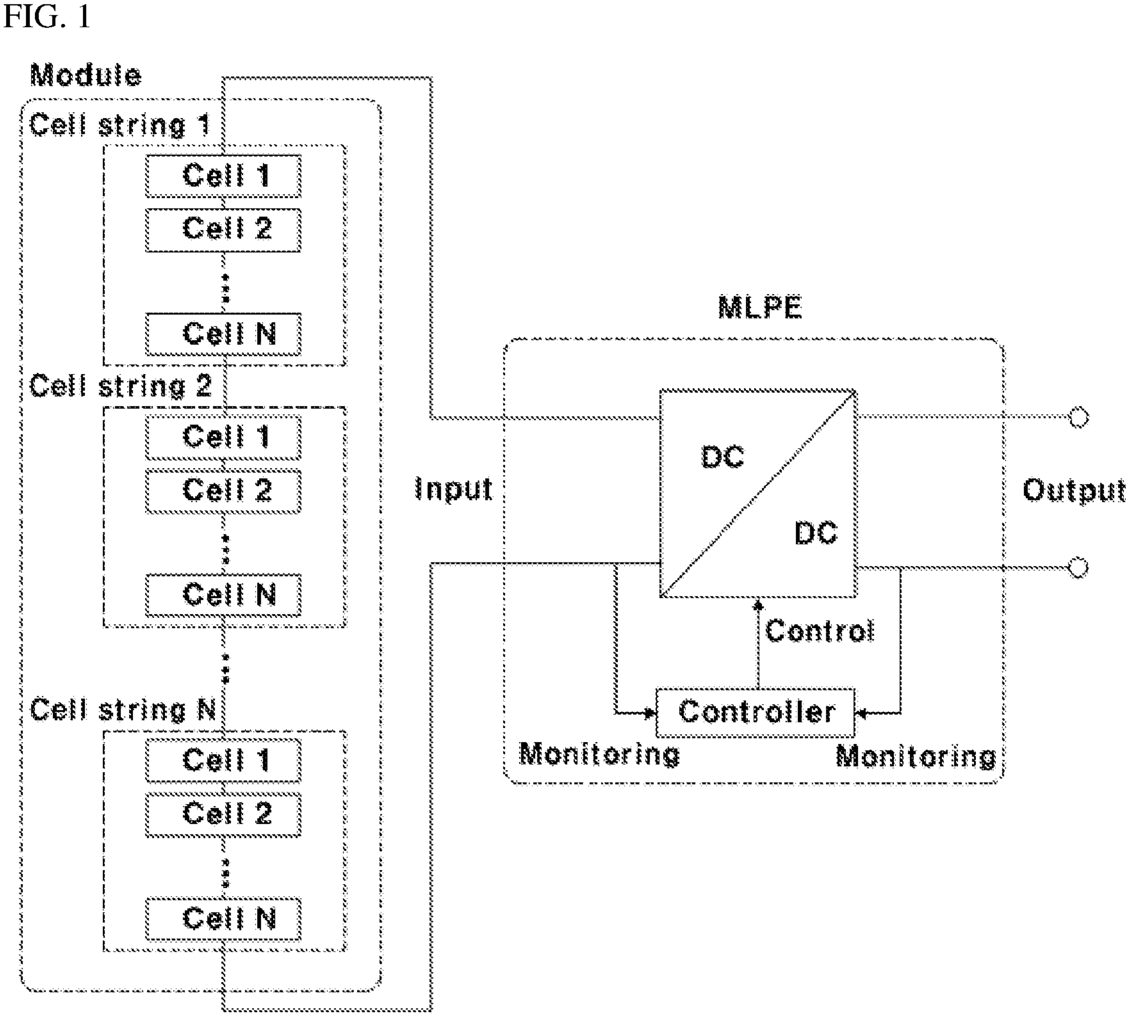
FIGS. 1 to 4 are block diagrams of solar modules according to comparative embodiments of the present invention.
Figure 2:
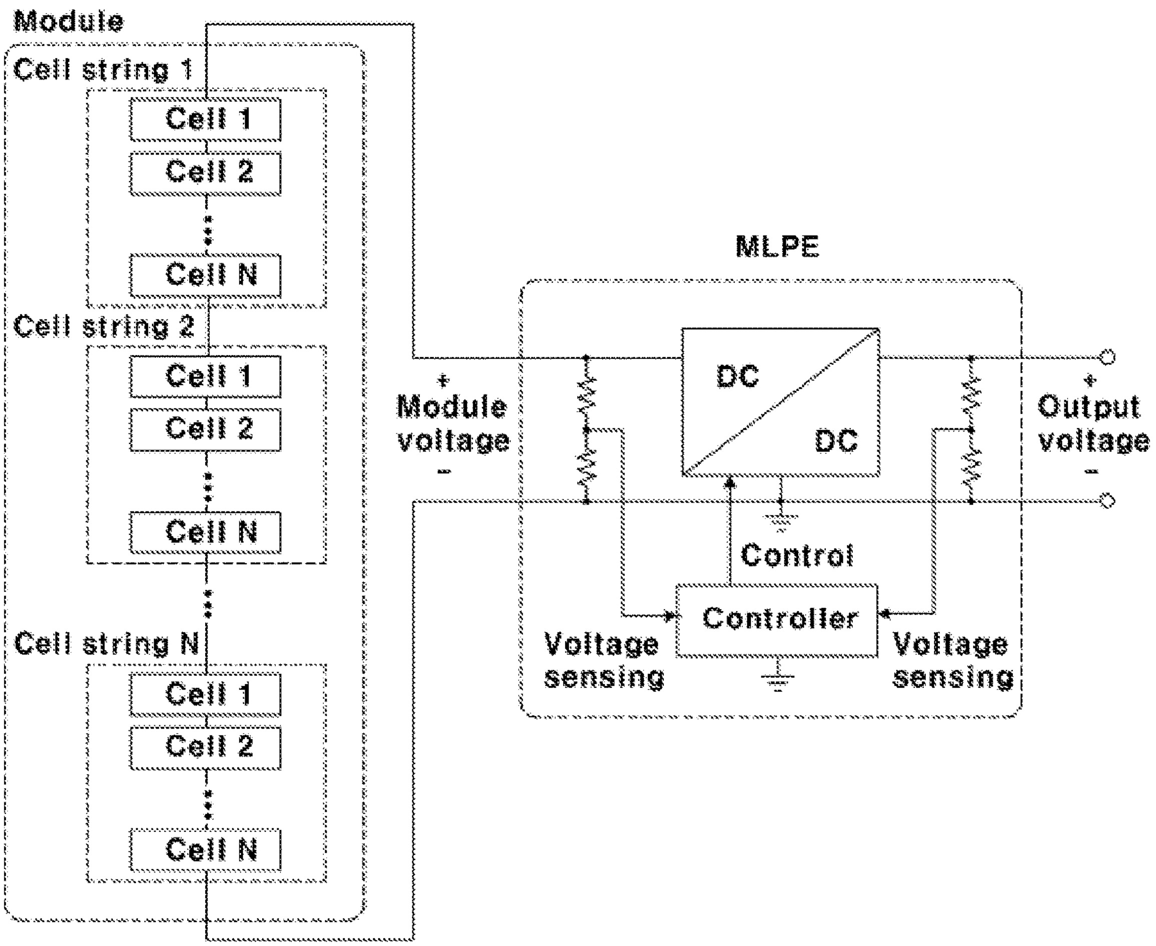

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may include the plural form unless specifically stated in the phrase, and when described as “at least one (or more than one) of A and B and C”, it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being ‘connected’, ‘coupled’ or ‘interconnected’ to another component, the component is not only directly connected, coupled or interconnected to the other component, but may also include cases of being ‘connected’, ‘coupled’, or ‘interconnected’ due that another component between that other components.

In addition, when described as being formed or arranged in “on (above)” or “below (under)” of each component, “on (above)” or “below (under)” means that it includes not only the case where the two components are directly in contact with, but also the case where one or more other components are formed or arranged between the two components. In addition, when expressed as “on (above)” or “below (under) ”, the meaning of not only an upward direction but also a downward direction based on one component may be included.

Modified embodiments according to the present embodiment may include some components of each embodiment and some components of other embodiments together. That is, a modified embodiment may include one embodiment among various embodiments, but some components may be omitted and some components of other corresponding embodiments may be included. Or, it may be the other way around. Features, structures, effects, and the like to be described in the embodiments are included in at least one embodiment, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and modifications should be construed as being included in the scope of the embodiments.

Figure 6:
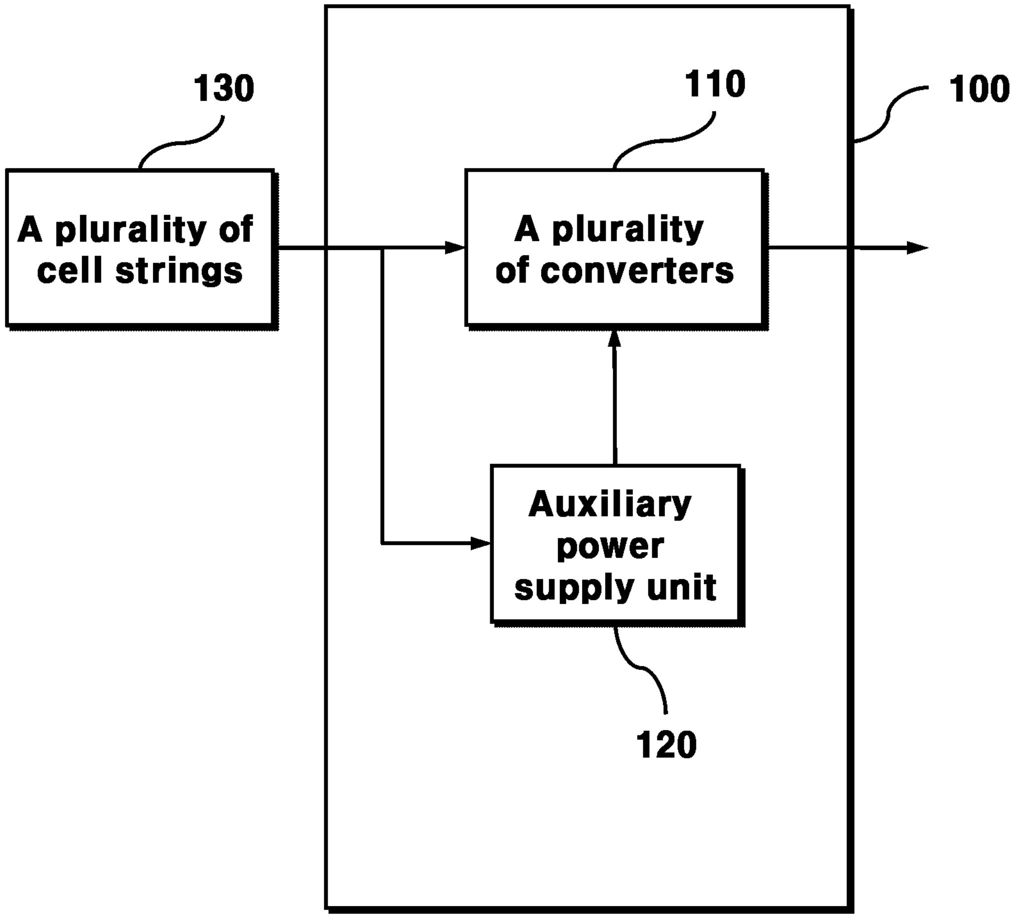
FIG. 6 is a block diagram of a power conversion device according to an embodiment of the present invention.

FIG. 6 is a block diagram of a power conversion device according to an embodiment of the present invention, and FIGS. 7 to 11 are diagrams for explaining the power conversion device according to an embodiment of the present invention.

The power conversion device 100 according to an embodiment of the present invention comprises a plurality of converters 110 and an auxiliary power supply unit 120, and may include a plurality of cell strings 130, a control unit (not shown), or various devices for driving a power conversion device.

Each of the plurality of converters 110 is connected to a plurality of cell strings. Each converter of the plurality of converters 110 may include at least one upper switch and at least one lower switch.

Here, each of the plurality of cell strings 130 may include at least one or more cell, and when including a plurality of cells, the plurality of cells may be connected in series. The cell strings 130 may be solar cell strings including solar cells. A string of solar cells may form a solar panel. A solar cell performs solar power generation (PV, photovoltaic) that generates power using the photoelectric effect. The photoelectric effect is the emission of electrons when light of a certain frequency or higher hits a specific metal material. A PN junction is formed using a p-type semiconductor and an n-type semiconductor, and electric power is generated by using electrons generated by the photoelectric effect to generate current. A solar cell is formed using silicon or the like and may be formed in a wafer form. The solar cell is located in a field that can receive sunlight well, an outer wall of a building, or a rooftop, and generates electric power using sunlight. At this time, the solar cell may be formed of building-integrated solar power generation (BIPV) being formed integrally with the building.

Figure 5:
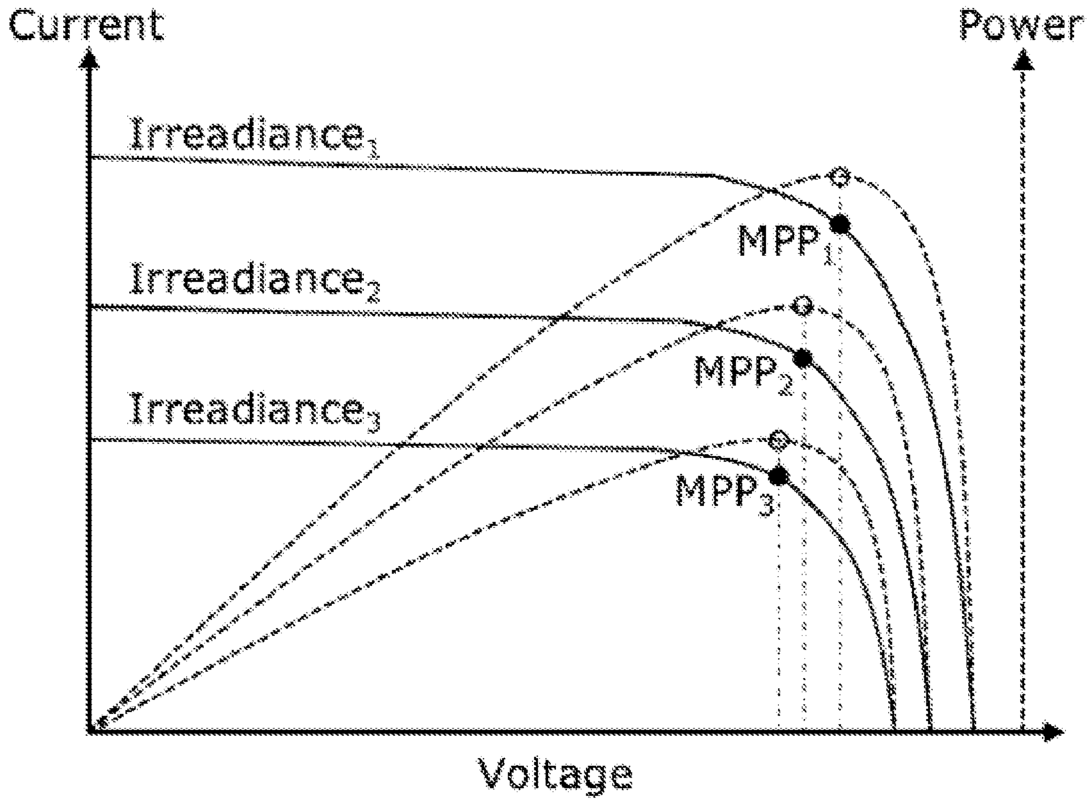
FIG. 5 is a diagram for explaining maximum power point tracking control.

Since the size of the power generated by one solar cell is not enough to be used in the load or power system, power of a size suitable for use may be generated by connecting a plurality of solar cells in series instead of one solar cell to form a solar cell string. A string of solar cells may be a basic unit for generating electrical power. A solar power generation panel can be formed by forming a plurality of cell strings, which are basic units, into a panel. As shown in FIG. 5, solar cells have different voltage-current characteristics depending on the amount of sunlight, temperature, and the like, and the maximum power point (MPP) also varies. (generated power=voltage×current) the power conversion device controls the solar cell to operate at the maximum power point (MPP), which is the operating point at which the solar cell has the maximum power under each condition. This is called maximum power point tracking (MPPT), and the efficiency of solar power generation can be increased by using maximum power point tracking. In solar power generation, depending on the characteristics of the relationship between current and voltage and voltage and power, the maximum power may be about 80% of the maximum voltage, not the maximum voltage. Since such a maximum power point continuously changes according to the magnitude of the voltage and current generated by the solar panel, it is necessary to continuously find a point where the maximum power point can be generated. That is, in order to follow the maximum power rather than the maximum voltage, the magnitudes of the voltage and current may be varied so as to reach the maximum power. That is, the voltage may be decreased and the current may be increased, or the voltage may be increased and the current may be decreased in the direction of increasing power.

The plurality of converters 110 includes a number of converters corresponding to the number of cell strings 130. Each converter 110 is connected to the corresponding cell string 130, receives power generated by the cell string 130, converts the voltage, and outputs it. As shown in FIG. 1, when all cell strings are connected in series and maximum power point tracking control is performed using one converter, if there is a difference in the amount of sunlight and the like between cell strings, it is difficult to optimally follow maximum power point tracking control, so that for efficient maximum power point estimation control, a plurality of converters respectively connected to a plurality of cell strings are included in order to perform maximum power point tracking control in units of cell strings.

The converters 110 are DC-DC converters, and may convert a signal having a first voltage into a signal having a second voltage and output the converted signal. Or, it may convert a signal having a first current into a signal having a second current and then output. At this time, a plurality of converters 110 has a multi-level structure. The plurality of converters 110 may be connected in cascode to form a multilevel. Here, the cascode means a form in which output stages are connected in multiple stages, and the output stages of the converter are piled up according to the cascode connection to have a multi-level structure. Multi-level refers to a structure in which the output signals of each converter are combined and output as one signal. At this time, the (−) terminal of the output terminal of the upper level converter is sequentially connected to the (+) terminal of the output terminal of the neighboring lower level converter, and the output of the highest level converter to the lowest level converter is combined to form one signal.

The control unit applies a control signal to each of the plurality of converters 110. A plurality of converters 110 receives the control signal to perform power conversion. At this time, maximum power point tracking control can be performed or bypass operation can be performed.

Each of the plurality of converters 110 receives a control signal from the control unit and performs maximum power point tracking so that the power of the cell strings 130 connected to each other becomes the maximum power. When a solar module formed of a plurality of cell strings is formed over a certain area, since the maximum power point between the cell strings becomes different when the amount of sunlight is different between the cell strings, each of the plurality of converters performs maximum power point tracking control for each cell string so that a maximum power is generated in each cell string. Through this, maximum power point tracking control optimized for each cell string is possible.

The plurality of converters 110 is needed to perform a bypass function to output the voltage of the cell string as is, depending on the situation. When some of the cell strings of the plurality of cell strings 130 generate lower voltages than other cell strings due to shading, and the like, in order to reduce loss and increase efficiency by reducing the voltage difference between each cell string, the voltage of another cell string can be bypassed as an output.

The auxiliary power unit 120 supplies driving power to each of the plurality of converters 110.

Each of a plurality of converters 110 may include at least one upper switch and at least one lower switch, and may perform power conversion by controlling the upper switch and the lower switch on and off. At this time, the upper switch and the lower switch may be complementarily conducted. Each switch can be controlled by the time it maintains turn-on, that is, the duty ratio depending on the situation. Here, the duty ratio means the turn-on ratio within a certain period, and is also referred to as duty ratio. During a power conversion operation, the duty ratio may vary depending on the power to be converted, and during a bypass operation, the duty ratio of the upper switch may be operated at 100%. The switching device may be a semiconductor switching device such as a FET or an IGBT. Each switch may be a switching element that receives driving power to be operating, driving power is required in order to operate each switch, and the auxiliary power unit 120 provides driving power necessary for the converter 110 to operate.

Figure 3:
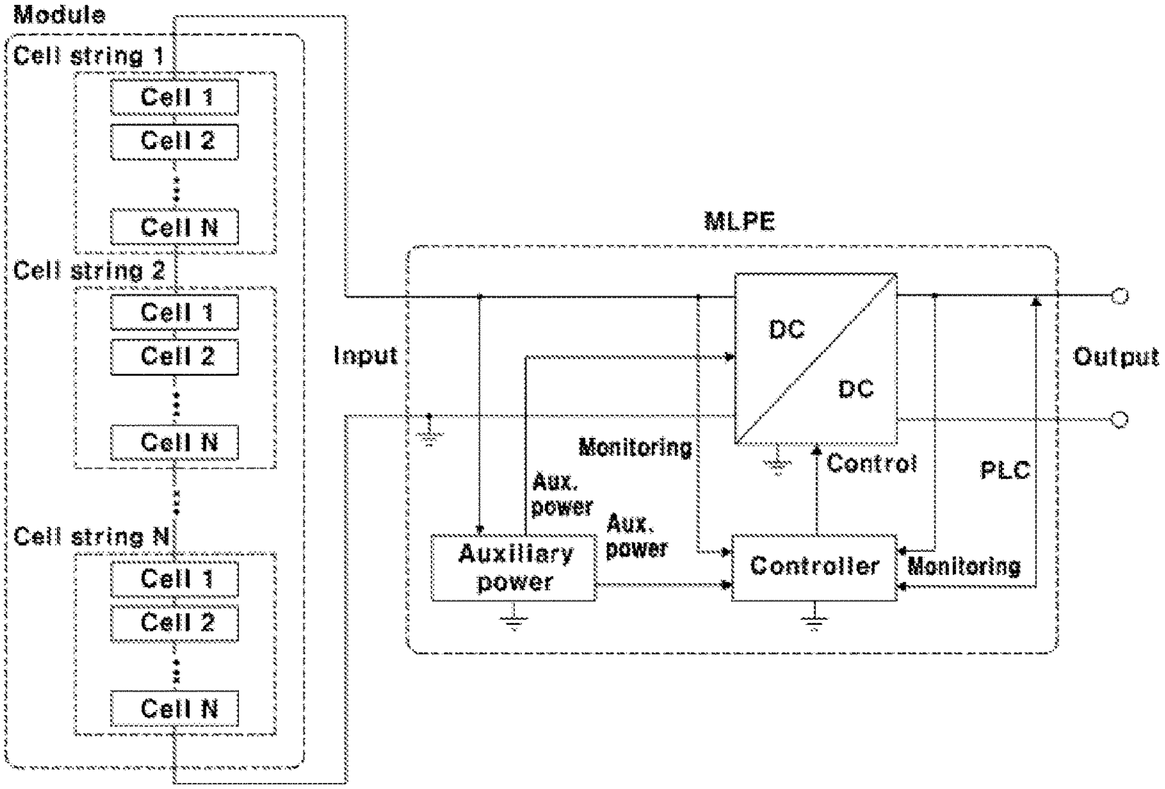
Figure 4:
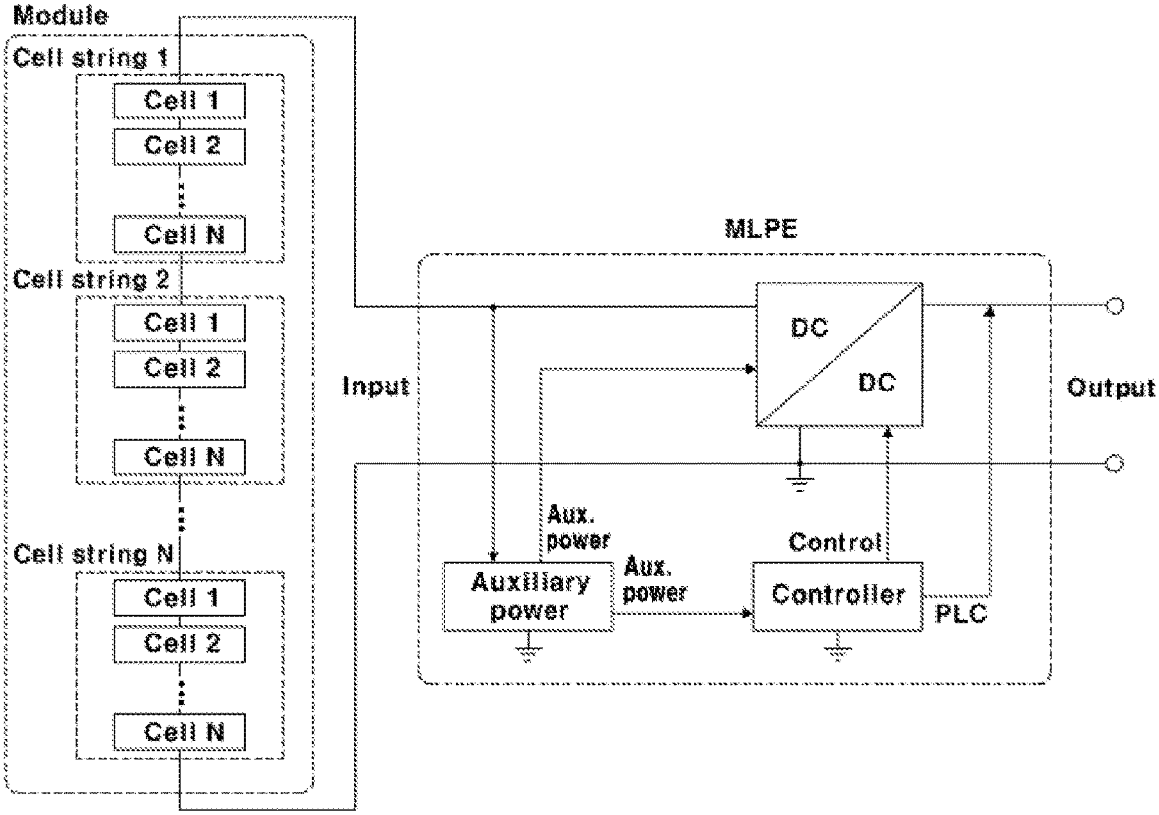
Figure 7:
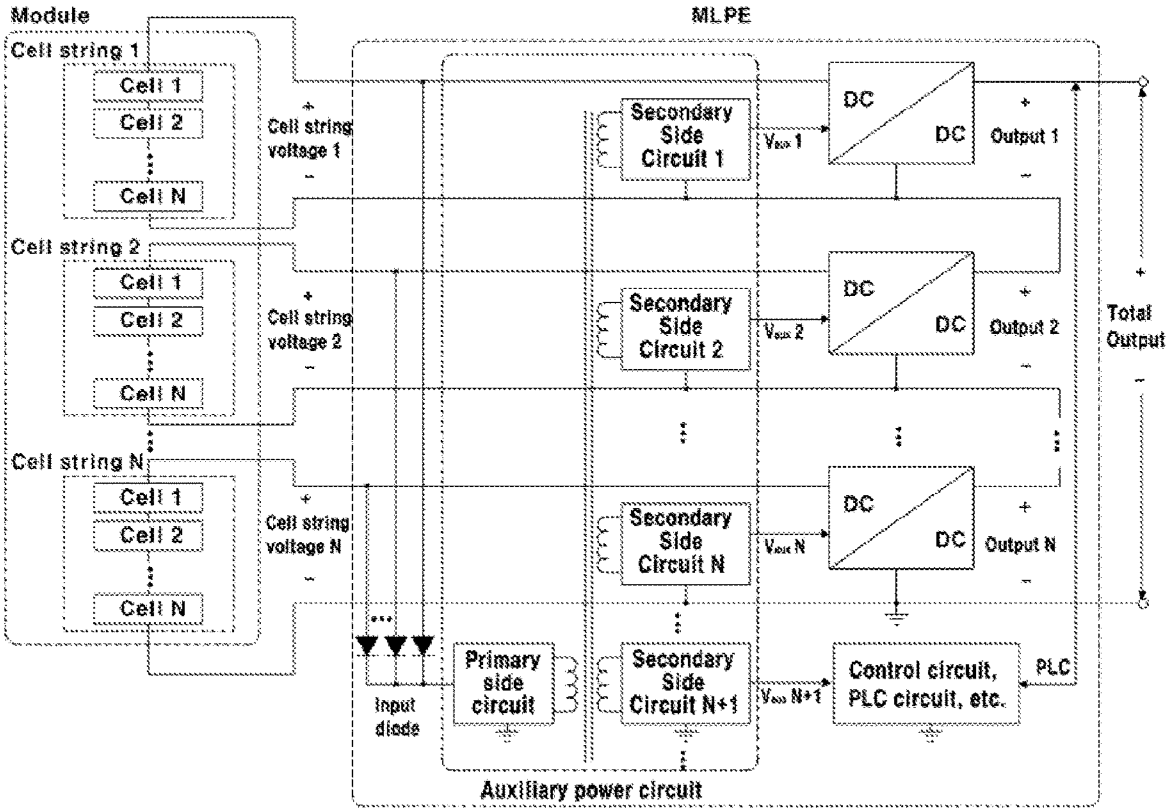
Figure 8:
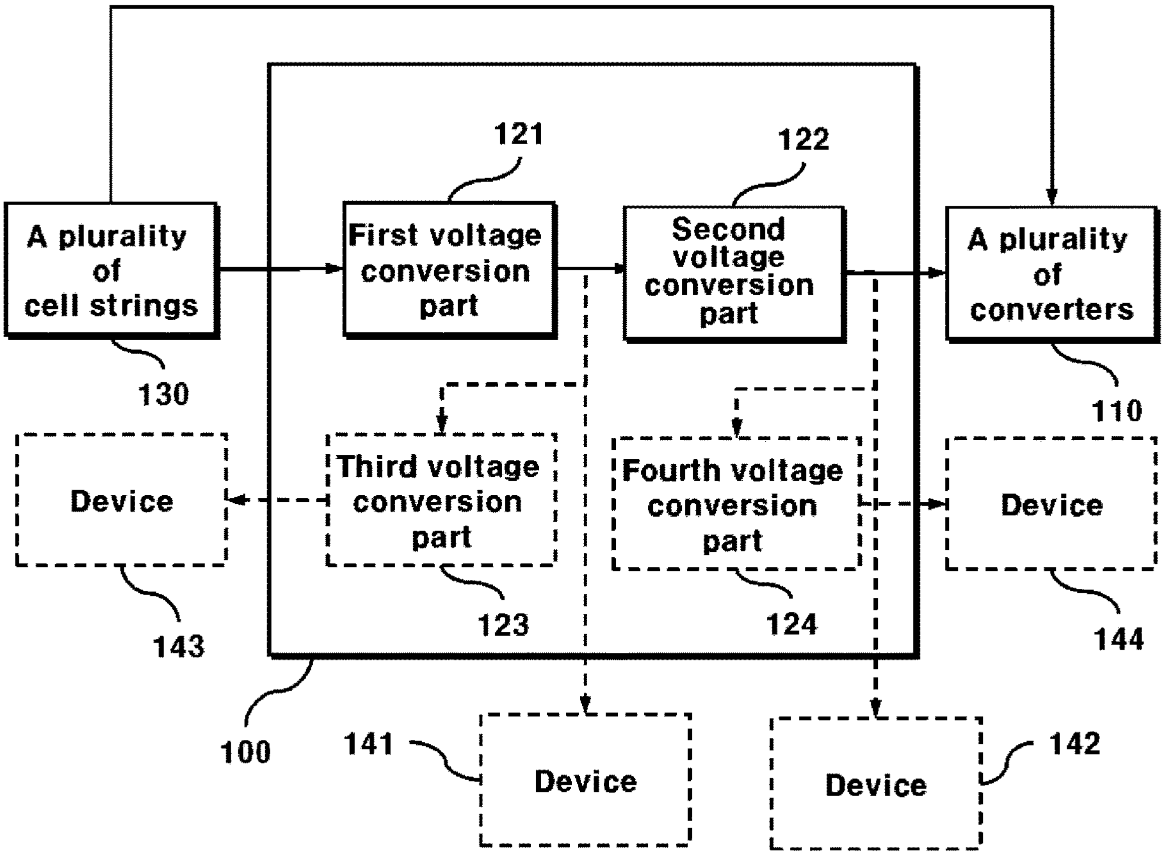

As shown in FIG. 7, auxiliary power can be generated and provided to each converter. An auxiliary power circuit can be configured to generate and supply auxiliary power (VAUX X) with respect to the reference potential of each converter. The auxiliary power circuit supplies driving power to each of the plurality of converters. Unlike FIGS. 3 and 4, where the cell string, converter, controller, and auxiliary power all use the same ground, when configured at multi-level, auxiliary power appropriate for each level must be supplied. An isolated converter is used, wherein the primary circuit of the isolated converter receives the voltage of at least one output terminal among the output terminals of the plurality of cell strings, the isolated converter outputs a voltage to the secondary circuit according to the voltage of the primary circuit, and the plurality of secondary circuits may supply driving power to each of the plurality of converters using the voltage being outputted from the isolated converter. However, as the range of voltage fluctuation of the cell string widens, the input voltage range of the isolated converter also widens, making design and optimization more difficult. If the auxiliary power circuit cannot respond to a wide input voltage range, even if power is generated from a solar cell, the MLPE may not operate because the auxiliary power circuit does not operate, so it is necessary to configure an auxiliary power circuit that can be used even in a wide input range.

In order to generate auxiliary power over a wide input range, the auxiliary power unit 120 comprises a first voltage conversion part 121 and a second voltage conversion part 122, and may include a third voltage conversion part 123 or a fourth voltage conversion part 124.

The first voltage conversion part 121 converts the first voltage of at least one output terminal among the plurality of cell strings 130 into a second voltage, and the second voltage conversion part 122 converts the first voltage into a second voltage. The second voltage outputted from the first conversion part 121 is converted into a third voltage to supply driving power to each of the plurality of converters 110.

The first voltage conversion part 121 may convert the first voltage of at least one output terminal among the output terminals of the plurality of converters 110 and each output terminal of the plurality of cell strings 130 into a second voltage and output. The first voltage conversion part 121 can not only receive voltage input from the plurality of cell strings 130, but also can receive voltage input from the output terminals of the plurality of converters 110. In addition, voltage can be input from various configurations.

The first voltage conversion part 121 connects each output terminal of the plurality of cell strings 130 in parallel through a switching element, and receives and converts voltage from at least one output terminal among the output terminals of the plurality of cell strings 130 and outputs it.

At this time, the switching element may be a diode. The output terminals of the plurality of cell strings are all connected through diodes, so that the highest voltage among the cell string voltages can be selectively applied. In other words, even if some cell strings lack sunlight, driving power for all converters can be provided using the voltage of other cell strings that generate sufficient power. Through this, redundancy can also be secured. Or, it is natural that the voltage of a specific cell string can be inputted and used to supply auxiliary power without a diode.

Instead of converting the voltage at the cell string output terminal and supplying it directly to the driving power of each converter, the first voltage conversion part 121 converts the first voltage being inputted from one among the cell string output terminals into a second voltage and outputs it, so that the second voltage conversion part 122, which supplies driving power, can receive input and convert it.

Figure 9:
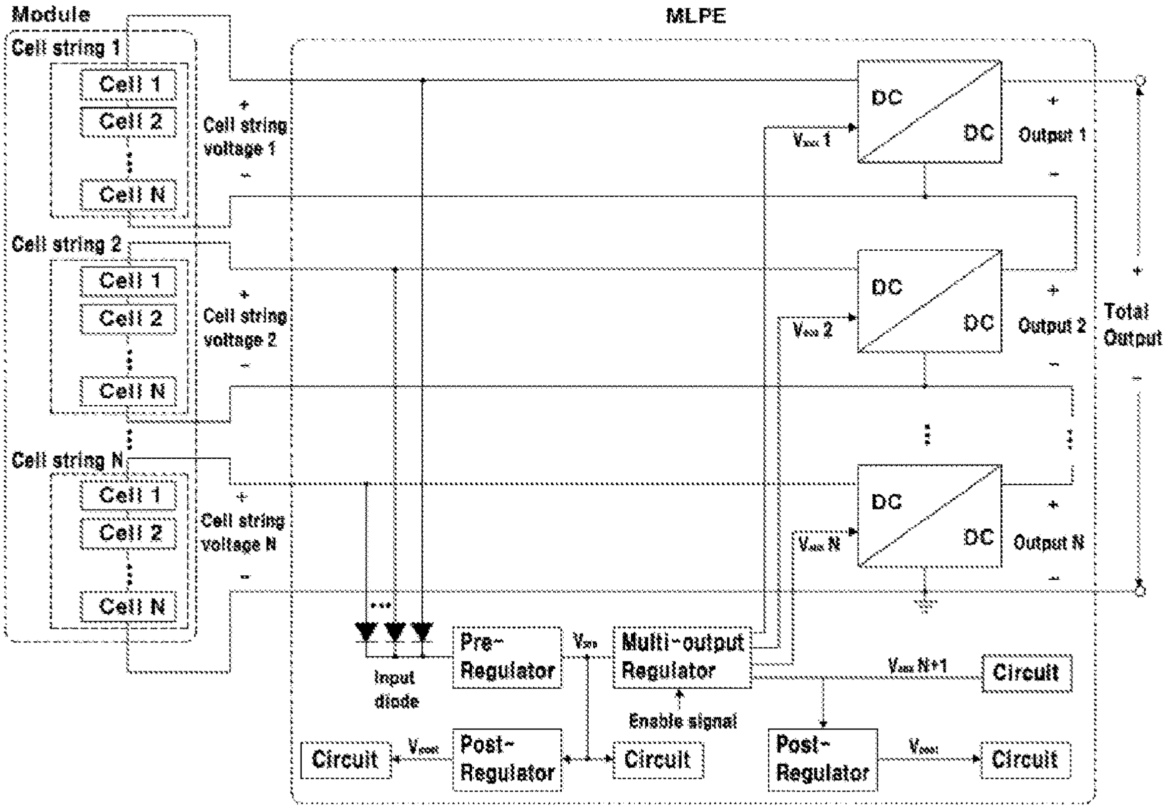

As shown in FIG. 9, the driving power is not supplied to each converter directly from the pre-regulator, which is the first voltage conversion part 121, but driving power can be supplied to each converter through the first voltage conversion part 121 and the second voltage conversion part 122. At this time, the second voltage conversion part 122 must supply driving power to each of the plurality of converters, so a multi-output regulator can be used. Through two-step voltage conversion of the first voltage conversion part 121 and the second voltage conversion part 122, the auxiliary power supply unit 120 can be sufficiently operated even if the range of the input voltage is wide. Through this, the input voltage range in which the auxiliary power unit 120 can operate normally can be expanded using the first voltage conversion part 121. The input voltage range of the second voltage conversion part 122 can be reduced by using the first voltage conversion part 121, it is possible to prevent overvoltage from being applied to the second voltage conversion part 122 or from overvoltage occurring, and the voltage at which under voltage lock out (UVLO) and voltage brown out (BO) occurs can be lowered.

The first voltage conversion part 121 may output the magnitude of the second voltage differently depending on the range of the first voltage. When the range of the first voltage, which is the voltage being applied to the auxiliary power supply, is high, step-down of the first voltage is necessary, and the second voltage can be outputted within the range of the voltage output due to step-down of the first voltage. In addition, when the range of the first voltage is low, boosting the first voltage is required, and the second voltage can be outputted in the range of the voltage output due to the boosting of the first voltage. Alternatively, a second voltage having a constant voltage level can be outputted regardless of the level of the first voltage.

The first voltage conversion part 121 may include at least one among a step-down regulator, a step-up regulator, and a step-up regulator. If the range of the first voltage is a voltage range in which it is difficult for the second voltage conversion part 122 to convert the voltage and supply driving power to the plurality of converters 110, and step-down or step-up of the first voltage is required, the first voltage can be converted to the second voltage and outputted using the corresponding regulator.

When the range of the first voltage requires step-down, use a step-down regulator; when the range of the first voltage needs to be boosted, use a boost-type regulator; and when the range of the first voltage requires step-down or step-up, a step-down and step-up regulator can be used. When the range of the first voltage is constant, accordingly, one among a step-down regulator, a step-up regulator, and a step-up and step down regulator can be used; and when the range of the first voltage is variable, two or more regulators among a step-down regulator, a step-up regulator, and a step-down and step-up regulator are included, but can be used selectively.

The first voltage conversion part 121 may include at least one among a buck converter, a linear regulator, a boost converter, a charge pump, and a buck-boost converter. When step-down of the first voltage is required, a buck converter or linear regulator, which is a step-down regulator, can be used. When boosting the first voltage is required, a boost converter or a charge pump, which is a step-down regulator, can be used. When only step-down or step-up is required, the circuit configuration is relatively simple and can be implemented with low material costs. However, if step-up or step-down of the first voltage is required, a buck-boost converter can be included. At this time, a non-inverting buck-boost converter in which the output voltage is not inverted to a negative voltage can be used. The non-inverting buck-boost converter requires four semiconductor switches, making the circuit relatively complex and material costs high.

In constructing the first voltage conversion part 121, two or more stage regulators connected in cascade can be used. The two or more stage regulator may include at least two among a linear regulator, a charge pump, a step-up converter, and a step-up converter. Two stages of the same or different types of regulators can be used. In implementing an auxiliary power circuit capable of step-up and step-down, a step-up regulator and a step-down regulator can be configured in cascade. At this time, the circuit can be implemented regardless of the arrangement order of the step-up and step-down regulators. In a two-stage regulator configuration, the step-up and step-down type means that step-up and step-down of the first voltage is possible.

At this time, the two or more stage regulators may include a step-down regulator and a step-up regulator. Here, the step-down regulator may include at least one of a linear regulator and a buck converter, and the step-up regulator may include at least one of a charge pump and a boost converter. A two-stage regulator can be used in combination with a linear regulator, secondary pump, step-up converter, step-up converter, and step-up converter. In implementing the step-up and step down type function with a two-stage regulator, a step-down regulator and step-up regulator can be used in combination. When combining a step-down regulator and a step-up regulator, material costs can be reduced compared to using a buck-boost converter to implement voltage step-up and step-down.

As shown in FIG. 10, the first voltage conversion part 121 may use different regulators depending on the range of the first voltage, which is the input voltage of the auxiliary power unit 120.

When the first voltage is in the range V1 to V2, the first voltage conversion part 121 can be implemented as a step-down regulator to limit the upper limit of the input voltage of the second voltage conversion part 122 or to prevent overvoltage. For example, when the voltage applied to the auxiliary power unit 120 is 10 to 100V, this can be converted to 10 to 12V or 3.3V/5V and supplied to the second voltage conversion part 122. At this time, a buck converter or linear regulator can be used as a step-down regulator.

When the first voltage is in the range V3 to V4, the lower limit of the input voltage of the second voltage conversion part 122 can be limited or the voltage at which UVLO/BO occurs can be lowered by implementing the first voltage conversion part 121 as a step-up regulator. For example, if the voltage being applied to the auxiliary power unit 120 is 5 to 20V, it can be limited to 12 to 20V or converted to 24V and supplied to the second voltage conversion part 122. At this time, a boost converter or charge pump can be used as a step-up regulator.

When the first voltage is in the V3 to V2 range, the input voltage range of the second voltage conversion part 122 is reduced and limited so as to prevent overvoltage and UVLO/BO voltage at which UVLO/BO occurs can be lowered by implementing the first voltage conversion part 121 as a step-up and step-down type regulator. For example, when the voltage applied to the auxiliary power unit 120 is 5 to 100V, it can be limited to 10 to 15V or 12V and supplied to the second voltage conversion part 122. At this time, a buck-boost converter can be used as a step-up and step-down type regulator.

A step-up and step-down type regulator can be implemented with a combination of a step-down regulator and a step-up regulator.

When combining a step-down regulator and a step-up regulator, a combination as shown in FIG. 11 can be used. As shown in FIG. 11, the first voltage conversion part 121 can be formed by a linear regulator-charge pump combination, a linear regulator-boost converter combination, a buck converter-charge pump combination, and a buck converter-boost converter combination. Among these, combinations of 1 to 3 can reduce material costs compared to non-inverting buck-boost converters.

The first voltage conversion part 121 may supply power to the device 141 operating at a second voltage. The first voltage conversion part 121 may supply power to a device operating at a second voltage other than the second voltage conversion part 122. The second voltage being generated in the process of generating auxiliary power may be supplied to devices other than the auxiliary power of the plurality of converters 110. The second voltage being outputted from the first voltage conversion part 121 can be used as a power source for various devices such as MCU, which is a control unit, sensor, controller, EEPROM, and PLC circuit.

The third voltage conversion part 123 may convert the second voltage into a fourth voltage and output it. When the driving power of the device 143 to be supplied with power using the second voltage being generated in the first voltage conversion part 121 is different from the second voltage, supplying of power becomes difficult. Accordingly, the third voltage conversion part 123 may convert the second voltage into the fourth voltage and output it to correspond to the driving power of the corresponding device. The third voltage conversion part 123 may supply power to the device 143 operating at the fourth voltage. The second voltage being outputted from the third voltage conversion part 123 can be used as a power source for various devices such as MCU, which is a control unit, sensor, controller, EEPROM, and PLC circuit. The third voltage conversion part 123 may be a post-regulator.

The first voltage conversion part 121 outputs a second voltage corresponding to the magnitude of the voltage that can be converted in the second voltage conversion part 122, or may output a second voltage corresponding to the magnitude of the rated voltage of the device 141 that can be immediately used as a second voltage. That is, the second voltage conversion part 122 outputs a second voltage in the range of convertible voltage, and may output a second voltage corresponding to the magnitude of the rated voltage of the device 141 that can be immediately used as a power within the corresponding range.

The second voltage conversion part 122 receives a second voltage being outputted from the first voltage conversion part 121, converts the second voltage into a third voltage, and supplies driving power to each of the plurality of converters 110. The second voltage conversion part 122 may include an isolated converter. The isolated converter converts the voltage of the primary circuit and transfers it to the secondary circuit. The isolated converter can output a voltage to the second secondary circuit according to the voltage of the primary circuit.

Each of the plurality of converters 110 may include at least one upper switch and at least one lower switch, and may supply driving power to each of the upper switch and lower switch. For this purpose, the second voltage conversion part 122 may include: a first secondary circuit that supplies auxiliary power to the upper switch being included in each converter; and a second secondary circuit that supplies an auxiliary power to the lower switches being included in each converter. Through this, individual driving power can be provided to the upper and lower switches, and the upper switch can be operated at a 100% duty ratio, thereby increasing efficiency during bypass operation.

The second voltage conversion part 122 may include a multi-output regulator to supply driving power to each of the plurality of converters 110. Driving power can be supplied to each of the plurality of converters 110 through a plurality of outputs.

The second voltage conversion part 122 may be a multi-output isolated converter. At this time, the multi-output isolated converter may include; a first output that supplies auxiliary power to the upper switch included in each converter; and a second output that supplies auxiliary power to the lower switches included in each converter. An isolated converter capable of outputting multiple outputs with a single regulator can also be applied. By using an isolated converter capable of outputting multiple outputs, driving power can be supplied to the lower and upper switches included in the converter, respectively. Auxiliary power can also be generated by combining a separate converter that uses an output of the secondary circuit as an input, and a linear regulator.

The second voltage conversion part 122 may include at least one among a flyback converter, an LLC converter, and a forward converter. The second voltage conversion part 122 is an isolated converter and may include at least one of a flyback converter, a forward converter, and an LLC converter.

The second voltage conversion part 122 may perform primary side regulation (PSR). The PSR can be performed by referring to the output voltage of the secondary circuit having the same reference potential as the cell string 130 to which voltage is applied to the first voltage conversion part 121. The output of the secondary circuit part can be controlled by referring to the voltage reflected to the primary side through the transformer. An isolated transformer may use a tertiary winding to control the output of the first secondary circuit. The isolated transformer can also control by only referring to the secondary circuit output voltage, which is based on the same potential as the primary circuit. For example, when the primary circuit part is based on the ground, it can be controlled by referring to the output voltage of the secondary circuit part based on the ground.

The second voltage conversion part 122 may supply power to the device 142 operating at the third voltage. The second voltage conversion part 122 may supply power to the third voltage not only to the plurality of converters 110 but also to the device 142 operating at a second voltage. The third voltage being generated in the process of generating auxiliary power may be supplied to other devices 142 in addition to the auxiliary power of the plurality of converters 110. It can be used as a power source for various devices such as MCU, which is a control unit, sensor, controller, EEPROM, and PLC circuit.

The fourth voltage conversion part 124 may convert the third voltage into a fifth voltage and output it. When the driving power of the device 144 to be supplied with power using the third voltage being generated in the second voltage conversion part 122 is different from the second voltage, supplying of power becomes difficult. Accordingly, the fourth voltage conversion part 124 may convert the third voltage into the fifth voltage and output it to correspond to the driving power of the corresponding device. The fourth voltage conversion part 124 may supply power to the device 144 operating at the fifth voltage. The second voltage being outputted from the fourth voltage conversion part 124 can be used as a power source for various devices such as MCU, which is a control unit, sensor, controller, EEPROM, and PLC circuit. The third voltage conversion part 123 may be a post-regulator.

The second voltage conversion part 122 may operate by receiving an enable signal. The second voltage conversion part 122 may operate by receiving an enable signal from a control unit, server, or user. Here, the enable signal is a signal that causes an operation to occur, and may be an operation signal of the second voltage conversion part 122. The control unit may operate using the second voltage being outputted by the first voltage conversion part 121 or the fourth voltage being outputted by the third voltage conversion part 123. That is, because it can be operated by receiving driving power independently from the operation of the second voltage conversion part 122, after the control unit operates first, when it is necessary to operate the second voltage conversion part 122 such as a case that requires to supply auxiliary power to the plurality of converters 110, only then the second voltage conversion part 122 can be operated by inputting an enable signal to the second voltage conversion part 122. Since the second voltage conversion part 122 operates only in situations where operation is necessary, efficiency can be increased by reducing losses.

In addition, the timing of output generation of the second voltage conversion part 122 may be delayed using a circuit that applies an enable signal after a predetermined time delay. Since during the initial operation of the power conversion device, various situations such as overvoltage or overcurrent may occur before it is made safe, an enable signal can be applied to the second voltage conversion part 122 after delaying for a preset time to operate the second voltage conversion part 122.

In implementing the auxiliary power circuit applied to the MLPE, as described above, by implementing the auxiliary power supply unit 120 using the first voltage conversion part 121 and the second voltage conversion part 122, designing and optimization of the auxiliary power circuits having a wide input range becomes facilitated. By applying an auxiliary power circuit having a wide input range, the input voltage range in which the MLPE can operate is expanded, thereby increasing the conditions under which power generation can be performed.

Figure 12:
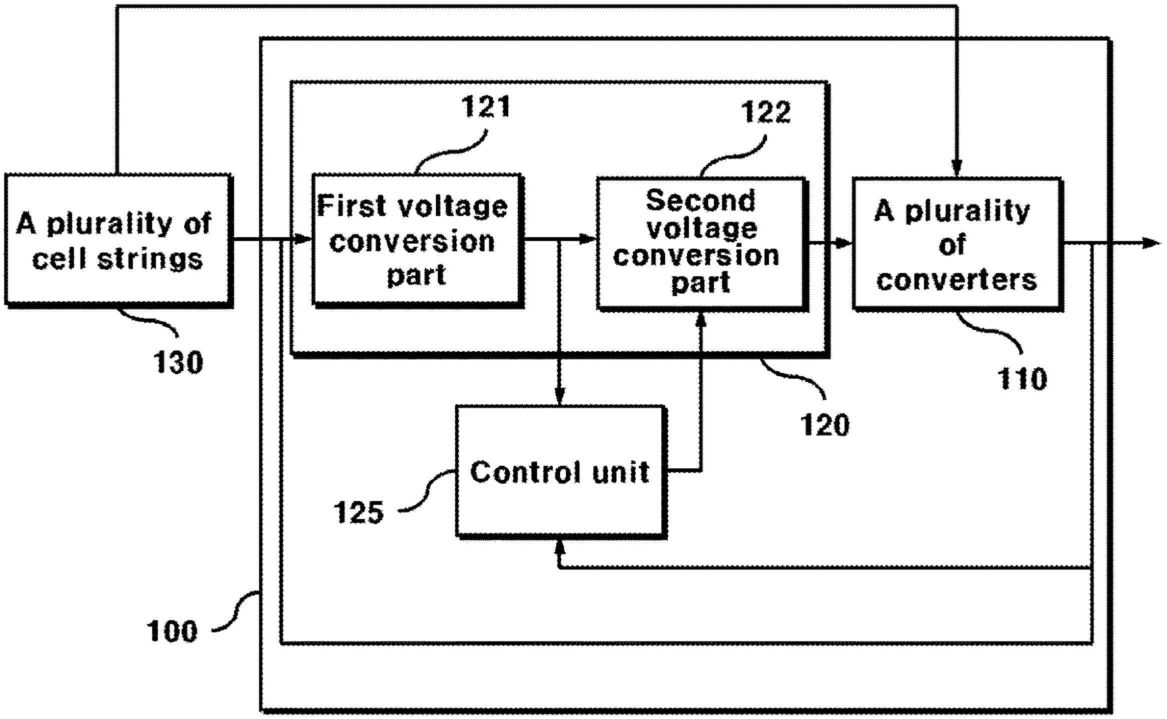
FIG. 12 is a block diagram of a power conversion device according to another embodiment of the present invention.

FIG. 12 is a block diagram of a power conversion device according to another embodiment of the present invention.

The power conversion device 100 according to another embodiment of the present invention comprises a plurality of cell strings 130, a plurality of converters 110, an auxiliary power supply unit 120, and a control unit 125. The detailed description of the power conversion device in FIG. 12 corresponds to the detailed description of the power conversion device in FIGS. 1 to 11, and overlapping descriptions will be omitted in the corresponding description below.

A plurality of converters 110 of the power conversion device 100 according to another embodiment of the present invention are respectively connected to a plurality of cell strings 130, and the plurality of converters 110 has a multi-level structure.

The auxiliary power unit 120 supplies driving power to each of the plurality of converters 110. The auxiliary power unit 120 includes: a first voltage conversion part 121 that converts the first voltage of at least one output terminal among the output terminals of the plurality of converters 110 and each output terminal of the plurality of cell strings 130 into a second voltage and outputs it; and a second voltage conversion part 122 that converts the second voltage outputted from the first voltage conversion part 121 into a third voltage and supplies driving power to each of the plurality of converters 110.

The control unit 125 monitors at least one among the input signals, output signals, and current flowing in the inductor included in each converter. The control unit 125 may transmit the monitored information to the outside through power line communication (PLC), or may generate and apply a control signal to each of the plurality of converters 110.

Each of the plurality of converters 110 receives a control signal from the control unit 120 and performs maximum power point tracking so that the power of the cell strings 130 connected to each other becomes the maximum power. When a solar module formed of a plurality of cell strings is formed over a certain area, since the maximum power point between the cell strings becomes different when the amount of sunlight is different between the cell strings, each of the plurality of converters performs maximum power point tracking control for each cell string so that a maximum power is generated in each cell string. Through this, maximum power point tracking control optimized for each cell string is possible.

The control unit 125 may perform not only function generating control signals for maximum power point tracking control and applying them to the plurality of converters 110, but also additional different functions. The control unit 125 may monitor at least one among the input signals and output signals of the plurality of converters 110, and the current flowing in the inductor included in each converter. In generating a control signal for maximum power point tracking control, since the input signal of the converter corresponding to the cell string voltage being outputted from the cell string 130 and the output signal being outputted from the converter must be used, the control unit 125 monitors the input and output signals of the converter. At this time, the voltage and current of the input signal and the voltage and current of the output signal can be monitored. In addition, the current flowing in the inductor comprising the converter 110 can be monitored to see if overcurrent flows and used for overcurrent protection. In addition, the control unit 125 may monitor versatile information required for power conversion.

The control unit 125 may transmit the monitored information to a higher level controller or to the outside. At this time, the control unit 125 may transmit the monitored information through power line communication (PLC). Power line communication is communication using power lines, and communication can be performed using power lines without a separate communication line. In addition, it is natural that various types of communication, either wired or wireless, can be used.

The first voltage conversion part 121 supplies driving power to the control unit 125, the control unit 125 outputs an enable signal to the second voltage conversion part 122, and the second voltage conversion part 122 may operate by receiving the enable signal. The control unit may operate using the second voltage being outputted by the first voltage conversion part 121. That is, since the control unit 125 can operate by receiving driving power independently of the operation of the second voltage conversion part 122, after the control unit operates first, when it is necessary to operate the second voltage conversion part 122 such as a case that requires to supply auxiliary power to the plurality of converters 110, only then the second voltage conversion part 122 can be operated by inputting an enable signal to the second voltage conversion part 122. Since the second voltage conversion part 122 operates only in situations where operation is necessary, efficiency can be increased by reducing losses.

Figure 13:
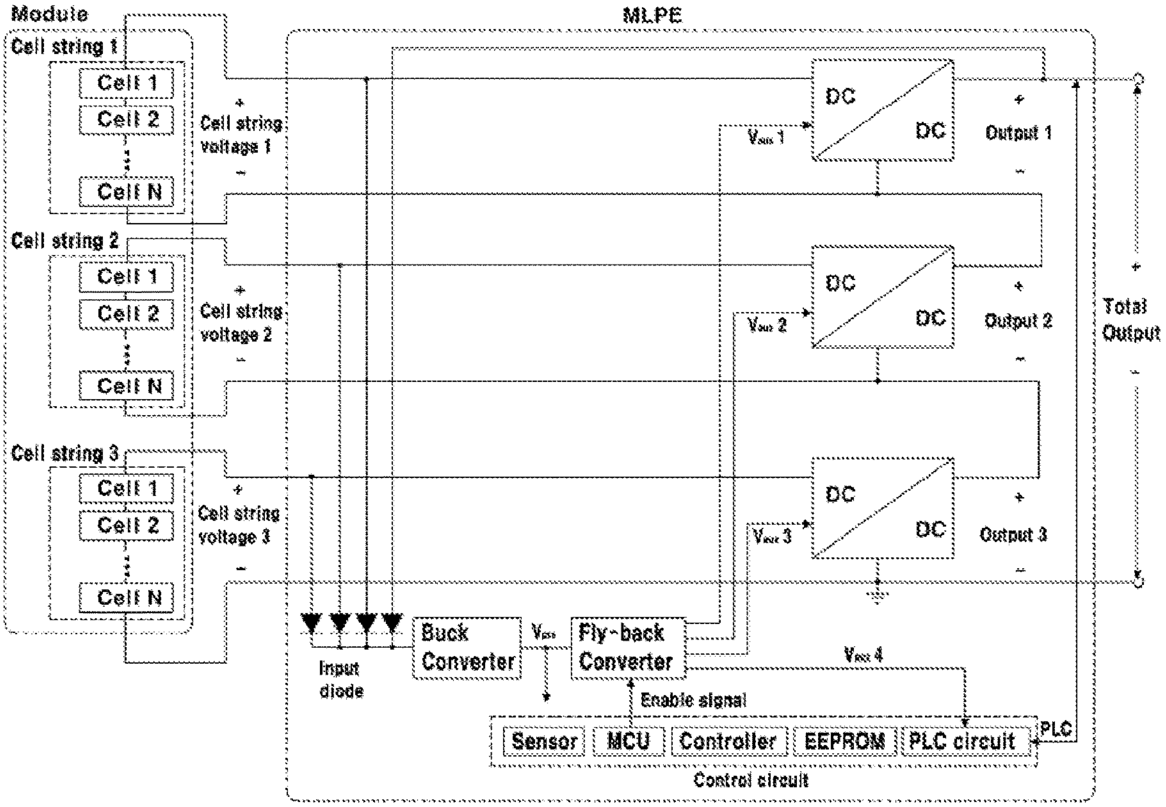
FIG. 13 is a diagram for explaining a power conversion device according to another embodiment of the present invention.

As shown in FIG. 13, the first voltage conversion part 121 may be a buck converter and may receive the output voltage of each cell string 130 and the plurality of converters 110 through a diode. The second voltage conversion part 122 may be a flyback converter. A plurality of voltages can be generated by inputting the output of the first voltage conversion part 121 to the second voltage conversion part 122. Through this, overvoltage of the second voltage conversion part 122 can be prevented and the input voltage range for the second voltage conversion part 122 can be reduced. In addition to the input of the second voltage conversion part 122, the output of the first voltage conversion part 121 can be used as a power source for control circuits such as MCU, which is a control unit 125, sensor, controller, EEPROM, and PLC circuit. The second voltage conversion part 122 may determine whether to generate an output voltage by referring to the enable signal applied from the control unit 125. The output of the second voltage conversion part 122 can be used as a power source to operate a multi-level DC/DC converter, control circuit, and the like.

Figure 14:
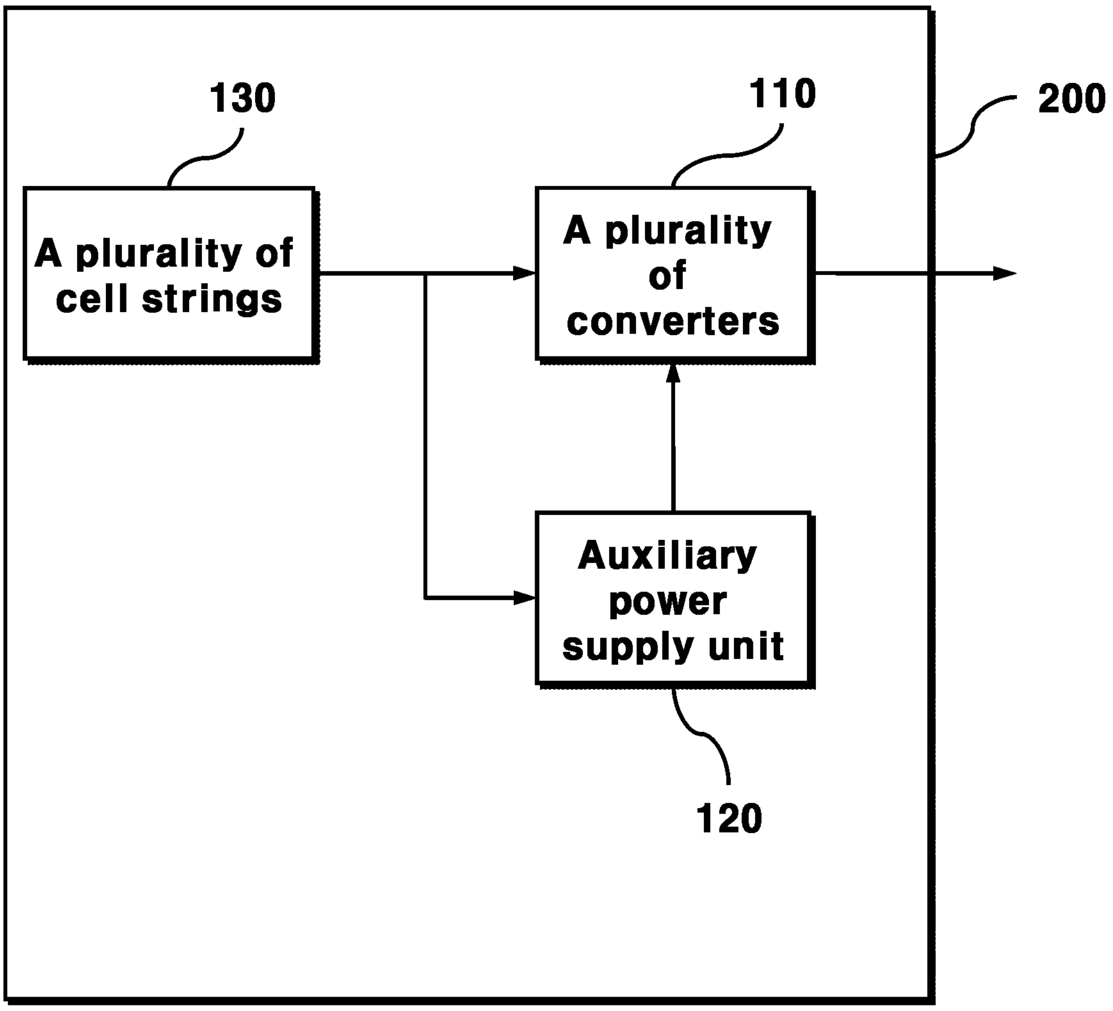
FIG. 14 is a block diagram of a solar module according to an embodiment of the present invention.

FIG. 14 is a block diagram of a solar module according to an embodiment of the present invention.

The solar module 200 according to an embodiment of the present invention comprises a plurality of cell strings 130, a plurality of converters 110, and an auxiliary power supply unit 120. The detailed description of the solar module in FIG. 14 corresponds to the detailed description of the power conversion device in FIGS. 1 to 12, and overlapping descriptions will be omitted below.

Each of a plurality of cell strings 130 of the solar module 200 according to an embodiment of the present invention includes one or more solar cells, and a plurality of converters 110 are respectively connected to the plurality of cell strings 130, and the plurality of converters 110 has a multi-level structure.

The auxiliary power unit 120 supplies driving power to each of the plurality of converters 110. The auxiliary power unit 120 comprises: a first voltage conversion part 121 that converts a first voltage of at least one output terminal among the plurality of cell strings into a second voltage and outputs it; and a second voltage conversion part 122 that converts the second voltage outputted from the first voltage conversion part 121 into a third voltage and supplies driving power to each of the plurality of converters 110.

Those skilled in the art related to the present embodiment will be able to understand that it may be implemented in a modified form within a range that does not deviate from the essential characteristics of the above description. Therefore, the disclosed methods are to be considered in an illustrative rather than a limiting sense. The scope of the present invention is shown in the claims rather than the foregoing description, and all differences within the equivalent scope shall be construed as being included in the present invention.

The invention claimed is:

1. A power conversion device comprising:
a plurality of converters respectively connected to a plurality of cell strings; and
an auxiliary power supply unit configured to supply driving power to each of the plurality of converters,
wherein the auxiliary power supply unit comprises:
a first voltage conversion part configured to convert a first voltage of at least one output terminal from among output terminals of the plurality of cell strings into a second voltage, and output the second voltage; and
a second voltage conversion part configured to convert the second voltage, outputted from the first voltage conversion part, into a third voltage and supply driving power to each of the plurality of converters,
wherein the plurality of converters constitutes a multi-level structure,
wherein each of the plurality of converters comprises at least one switch, and
wherein the driving power is a power to drive the at least one switch of each of the plurality of converters.

2. The power conversion device according to claim 1,
wherein the first voltage conversion part outputs a different level of the second voltage depending on a range of the first voltage.

3. The power conversion device according to claim 1,
wherein the first voltage conversion part comprises at least one of a step-down regulator, a step-up regulator, and a step-up and step-down regulator.

4. The power conversion device according to claim 1,
wherein the first voltage conversion part comprises at least one of a buck converter, a linear regulator, a boost converter, a charge pump, and a buck-boost converter.

5. The power conversion device according to claim 1,
wherein the first voltage conversion part supplies power to a device operating at the second voltage.

6. The power conversion device according to claim 1,
wherein the second voltage conversion part supplies power to a device operating at the third voltage.

7. The power conversion device according to claim 1,
wherein the second voltage conversion part operates by receiving an enable signal.

8. The power conversion device according to claim 1,
wherein the second voltage conversion part comprises an insulation type converter.

9. A power conversion device comprising:
a plurality of converters respectively connected to a plurality of cell strings;
an auxiliary power supply unit configured to supply driving power to each of the plurality of converters; and
a control unit configured to monitor at least one of an input signal, an output signal of the plurality of converters, and a current flowing in the inductor comprised in each of the converters,
wherein the auxiliary power supply unit comprises:
a first voltage conversion part configured to convert a first voltage of at least one output terminal from among output terminals of the plurality of cell strings into a second voltage, and output the second voltage; and
a second voltage conversion part configured to convert the second voltage, outputted from the first voltage conversion part, into a third voltage and supply driving power to each of the plurality of converters,
wherein the first voltage conversion part supplies driving power to the control unit,
wherein the plurality of converters constitutes a multi-level structure,
wherein each of the plurality of converters comprises at least one switch, and
wherein the driving power is a power to drive the at least one switch of each of the plurality of converters.

10. The power conversion device according to claim 9,
wherein the control unit outputs an enable signal to the second voltage conversion part, and
wherein the second voltage conversion part operates by receiving the enable signal.

11. A solar module comprising:
a plurality of cell strings each comprising one or more solar cells;
a plurality of converters respectively connected to the plurality of cell strings; and
an auxiliary power supply unit configured to supply driving power to each of the plurality of converters using voltages outputted from the each of the plurality of cell strings,
wherein the auxiliary power supply unit comprises:
a first voltage conversion part configured to convert a first voltage of at least one output terminal from among output terminals of the plurality of cell strings into a second voltage, and output the second voltage; and
a second voltage conversion part configured to convert the second voltage, outputted from the first voltage conversion part, into a third voltage and supply driving power to each of the plurality of converters,
wherein the plurality of converters constitutes a multi-level structure,
wherein each of the plurality of converters comprises at least one switch, and
wherein the driving power is a power to drive the at least one switch of each of the plurality of converters.

12. The solar module according to claim 11,
wherein the first voltage conversion part outputs a different level of the second voltage depending on a range of the first voltage.

13. The solar module according to claim 11,
wherein the first voltage conversion part comprises at least one of a step-down regulator, a step-up regulator, and a step-up and step-down regulator.

14. The solar module according to claim 11,
wherein the first voltage conversion part comprises at least one of a buck converter, a linear regulator, a boost converter, a charge pump, and a buck-boost converter.

15. The solar module according to claim 11,
wherein the first voltage conversion part supplies power to a device operating at the second voltage.

16. The solar module according to claim 11,
wherein, in the first voltage conversion part, each output terminal of the plurality of cell strings is connected in parallel through a switching element.

17. The solar module according to claim 11,
wherein the second voltage conversion part supplies power to a device operating at the third voltage.

18. The solar module according to claim 11,
wherein the second voltage conversion part operates by receiving an enable signal.

19. The solar module according to claim 11, wherein the second voltage conversion part comprises an insulation type converter.

* * * * *